Dec. 10, 1963  F. E. RUEGSEGGER  3,113,365
SELF-CLEANING AND RETRACTABLE TROWELING DEVICE
Filed June 1, 1961  3 Sheets-Sheet 1
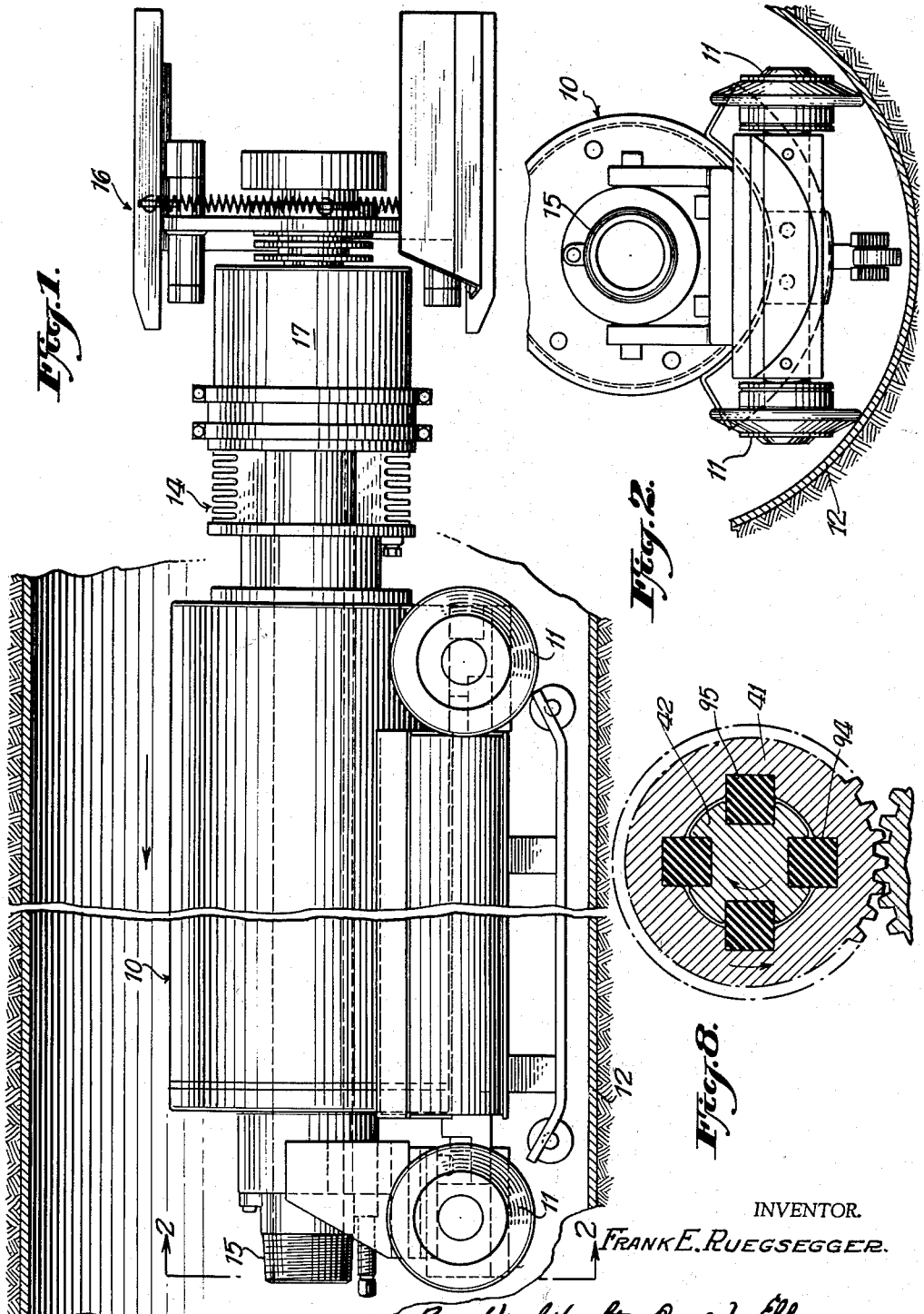
INVENTOR.
FRANK E. RUEGSEGGER.
ATTORNEYS.

Dec. 10, 1963   F. E. RUEGSEGGER   3,113,365
SELF-CLEANING AND RETRACTABLE TROWELING DEVICE
Filed June 1, 1961   3 Sheets-Sheet 2

INVENTOR.
FRANK E. RUEGSEGGER.
BY
Ward, Neal, Haselton, Orme, & McChannon.
ATTORNEYS.

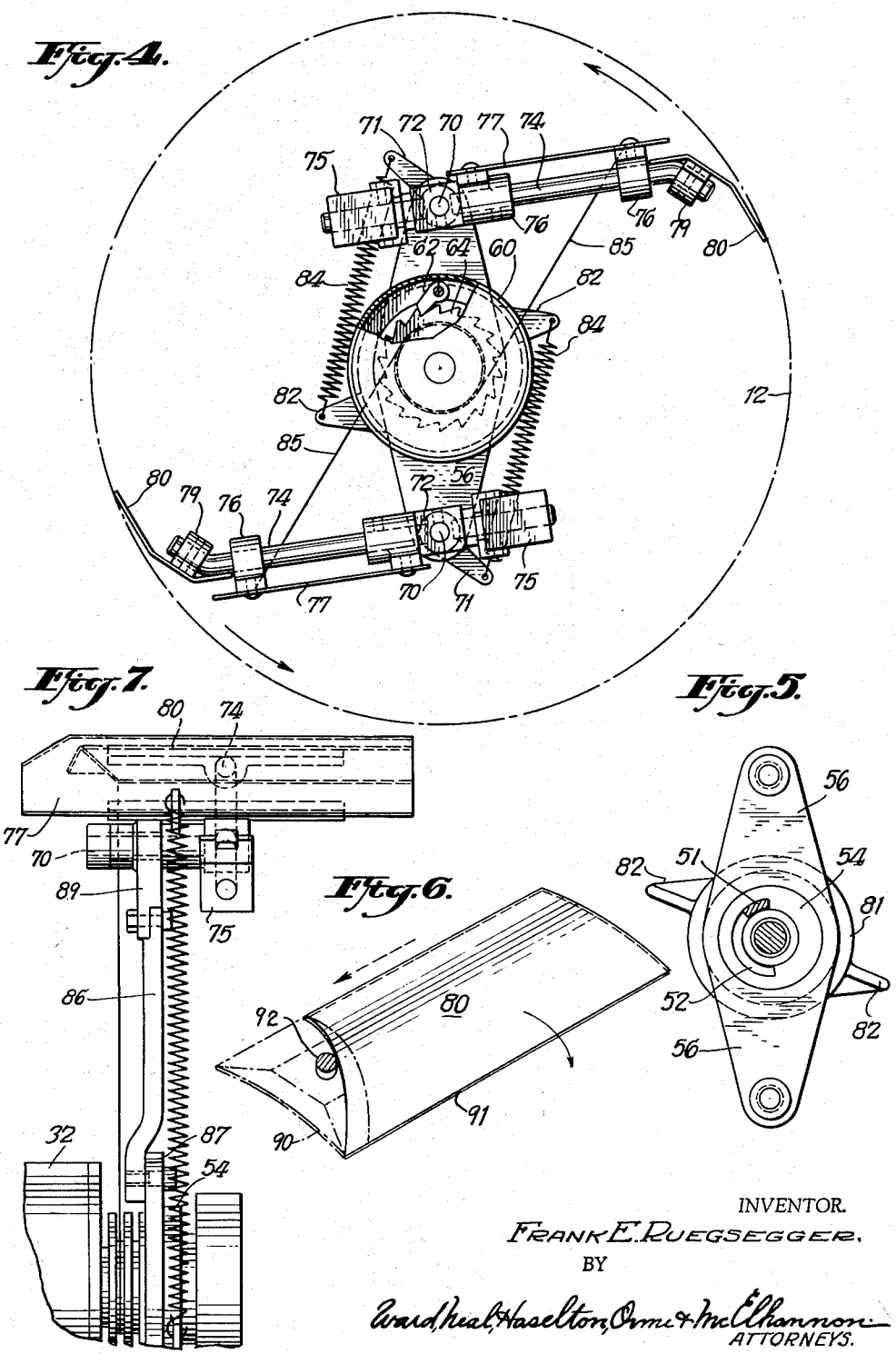

United States Patent Office 3,113,365
Patented Dec. 10, 1963

3,113,365
SELF-CLEANING AND RETRACTABLE
TROWELING DEVICE
Frank E. Ruegsegger, Oakland, N.J., assignor, by mesne assignments, to Raymond International Inc., New York, N.Y., a corporation of New Jersey
Filed June 1, 1961, Ser. No. 114,112
12 Claims. (Cl. 25—38)

This invention relates to apparatus for troweling lining material deposited on the interior surface of pipes and the like, and more particularly to troweling means that are retractable and which include a trowel, the leading edge of which automatically clears obstructions in the pipe.

Constructions of troweling apparatus have been known wherein a machine is propelled axially through a pipe while depositing lining material on the inner wall surface of the pipe by centrifugal force, and troweling the material by operation of trowels extending radially from a rotary drive mechanism on the machine behind the lining depositing apparatus. While machines embodying such constructions have achieved a certain degree of commercial success, they have nevertheless been subject to certain difficulties and disadvantages.

Thus, it has often been impossible for such machines to negotiate sharp curves encountered in the pipes because of the inflexibility inherent in the apparatus as a whole and especially in the radially extending trowels and trowel supporting apparatus.

Another difficulty frequently encountered in known devices is the inability of the leading edge of the trowels while advancing through a pipe to avoid contact with obstacles and obstructions projecting inwardly from the inner surface of the pipe. Such contact between the leading edge of trowels and obstructions in the pipe have in the past frequently caused damage to the trowel or to the lining being troweled, or both, thereby resulting in increased cost, lost time, and the necessity of replacing the trowel and of relining particular portions of the pipe with the possibility of a repetition of the original damage.

Additionally, machines of the class described have been subjected to some degree of vibration which adversely affects the deposition and troweling of the lining material and also shortens the life of various of the parts making up the apparatus.

Accordingly, I have conceived by my invention an effective solution to the problems presented and have actually constructed a successful and commercially desirable embodiment of this concept which eliminates the foregoing difficulties and disadvantages.

In essence, my invention resides in the provision of a trowel carrier, means mounting the trowel carrier for rotary movement, trowel means carried in normal operating position on the carrier for rotation therewith and for pivotal movement relatively thereto, and retraction means connected to the trowel means and operable to effect pivotal movement thereof relatively to the trowel carrier and out of operative position.

As an important feature of the invention, drive means are provided for transmitting the rotary movement to the trowel carrier for normal operation of the trowel means and the retraction means include means responsive to a reversal of the direction of rotation of the drive means for pivoting the trowel means relatively to the trowel carrier out of operative or normal troweling position and to a retracted position relatively to the normal troweling position. Resilient means such as helical springs may be provided for yieldingly resisting the movement of the trowel means to retracted position and for returning such means to operative position upon resumption of rotation of the drive means in the original annular direction. Actually, this feature of the invention is implemented by a lost motion connection between the drive means and the trowel carrier whereby, upon reversal of the direction of rotation of the drive means, the trowel carrier remains stationary and the retraction means operates to effect retraction of the trowel means.

As another feature of the invention, the retraction means may include a spool in driven connection with the drive means and a flexible cable connected between the spool and trowel means. During normal troweling operation of the drive means, the trowel carrier rotates and carries the trowel means in operating position. However, upon reverse rotation of the drive means the lost motion connection causes an interruption of power transmission to the trowel carrier which thereby remains stationary, but the spool rotates winding up the cable and pivoting the trowel means into retracted or non-operative position.

A further very important feature of the present invention concerns itself with the problem of avoiding contact between the leading edges of the trowels, while advancing through a pipe in operative or troweling attitude, and obstacles projecting inwardly from the inner wall surface of the pipe being lined. Thus, such obstacle has a theoretical curve of intersection with the rotating trowel surface. This curve is in fact a spiral projected radially from the pipe surface onto the trowel surface. Since the difficulty arises as a result of the leading edge of the trowel contacting the obstacle while rotating and advancing axially of the pipe, the edge, if made parallel to the curve of intersection, will always run parallel to an obstacle on the pipe wall. Furthermore, if the leading edge of the trowel is formed to follow a curve of greater pitch than the curve of intersection, the edge will actually recede from the obstacle although the linear movement of the trowel is towards the obstacle.

The pitch of the leading edge of the trowel for a particular situation is determined by dividing the trowel revolutions per second into the speed of linear travel of the trowel in feet per second. While the minimum requirement is for a trowel edge to be parallel to the curve of intersection, in practice it is preferred that a curve of somewhat greater pitch be used. It will be understood that in troweling, obstacles may be passed over by the trowel as a result of contact between the obstacles and a portion of the trowel behind the leading edge, but this is not a serious problem as will become apparent hereinafter. In this circumstance, the leading edge may run over an obstacle, but if the edge is formed in accordance with my present concept, will never run into it.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is an over-all elevational view of a pipe lining machine utilizing the present invention;

FIG. 2 is a front elevational view taken along the line 2—2 of FIG. 1;

FIG. 4 is an end elevational view of part of the trowel carrying mechanism;

FIG. 5 is a cross-sectional view taken along the line 5—5 of FIG. 3;

FIG. 6 is a perspective view of a trowel in accordance with the present invention;

FIG. 7 is a side elevational view of a trowel carrier extension; and

FIG. 8 is a cross sectional view taken along the line 8—8 of FIG. 3.

Figure 3:
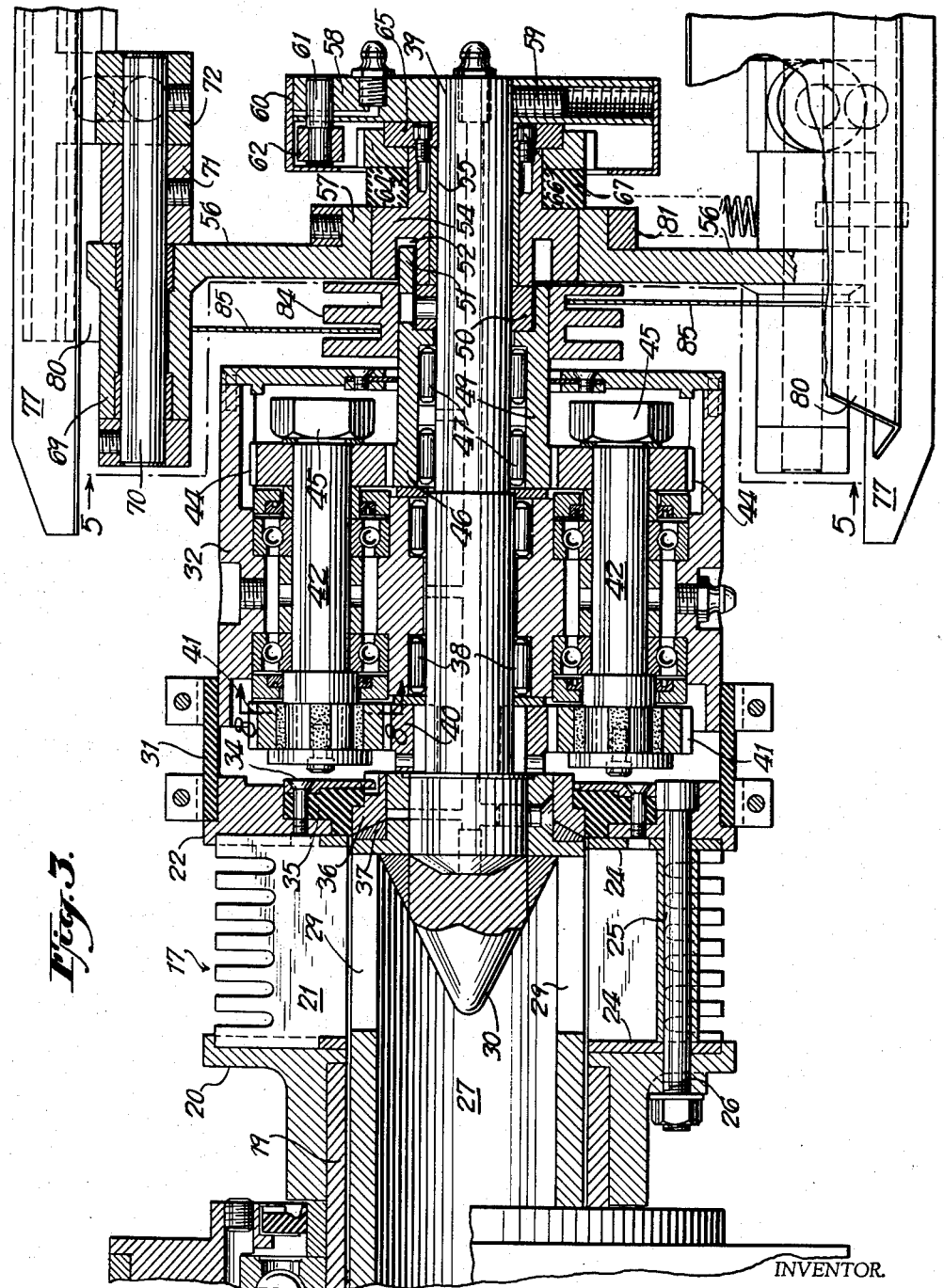
FIG. 3 is a vertical sectional view of part of the mechanism of FIG. 1 illustrating parts of the power transmission and trowel retracting apparatus.

Referring now specifically to the drawings, and more particularly to FIGS. 1 and 2 thereof, there is shown a pipe lining machine 10 having wheels 11 for moving the machine axially through a pipe 12 to be lined and troweled. The machine normally moves in the direction of the arrow and is equipped with a distributor head 14 that distributes mortar or other lining material on the inner surface of the pipe 12 in known manner as the machine advances, the lining material being delivered at the front end of the machine through a fitting 15. The machine is further provided with a trowel mechanism 16 driven through a transmission 17.

As shown in FIG. 3, a drive shaft 19 supports a distributor head hub 20 for rotation therewith along with finger plates 21 and end plate 22 connected to the hub through finger plate retainers 24, spacers 25 and bolts 26. A delivery pipe 27 extends axially within the shaft 19 and is formed with a series of end slots 29 radially inwardly of the finger plate 21; and a mounting stud plug 30 of conical form is positioned at the end of the delivery pipe 27, as shown.

From the description thus far, it will be seen that the lining material passing through the pipe 27 towards the plug 30 is diverted outwardly through slots 29 whereupon rotating finger plates 21 shear off portions of the material and by centrifugal force deposit it upon the interior of the pipe 12.

The transmission 17 comprises a planetary gear system directly coupled to the distributor head 14 by means of a leather drive sleeve 31 secured at one side to the end plate 22 and at the other side to a planet carrier 32 that rotates at the same speed as the end plate. In this connection, it should be noted that the end plate 22 carries a retainer plate 34 which in turn supports a rubber seal housing 35 for a seal 36 that rotates along with the end plate 22 and has face to face contact with a surface of a stationary seal cone 37.

Actually, the entire planetary system is mounted on a stationary stud 39 that is in turn an extension of the stationary exterior tube 19. It is well to mention here that a plurality of needle bearings 38 are fitted between the planet carrier 32 and the stud 39 to overcome friction therebetween. A sun gear 40 is keyed to the stud 39 and engages a pair of diametrically opposed input planet gears 41 carried by the planet carrier 32 so that they rotate around the sun 40.

Each of the input planet gears 41 has one end of a planet shaft 42 fixed thereto for rotation therewith both about its own axis and orbitally around the sun 40. To the other end of each shaft 42 is mounted an output planet gear 44 by means of a locknut and washer 45. These planet gears 44 are geared to an output sun gear 46 mounted through needle bearings 47 on a reduced section of the stud 39.

The output sun gear 46 has an integral sleeve portion 49 extending outwardly to the right, as viewed, and around the stud 39. A gear retainer 50 maintains the sun gear in position on the stud and is itself locked to the stud by a set screw (not shown).

The sleeve portion 49 has a lug 51 projecting outwardly from the end thereof and, as shown in FIGS. 3 and 5, this lug is received in a curved slot 52 formed in a trowel carrier 54 supported for rotary movement on a sleeve 55 on the stud 39. A pair of radially extending, diametrically opposed wings 56 are integral with a hub 57 mounted on the trowel carrier for rotation therewith and for a purpose to be later described.

An end plate 58 is fixed by means of a set screw 59 to the right hand end of the stationary stud 39, as viewed in FIG. 3, and carries a guard 60 on the periphery thereof. The end plate 58 is bored adjacent its upper end to receive a pivot pin 61 upon which is pivotally mounted a pawl 62 within the protective area of the guard 60, and which is preferably spring loaded.

The trowel carrier 54 has a ratchet wheel 64 mounted on a reduced portion thereof for rotation therewith, and a ratchet wheel retainer plate 65 is affixed by cap screws 66 to the trowel carrier and serves to retain the ratchet wheel snugly against a rubber friction ring 67.

From the description thus far given of the drive mechanism, it will be seen that as the end plate 22 rotates, the leather drive sleeve 31 transmits this movement to the planet carrier 32 which revolves around the stud 39 carrying the planet gears 41 and 44 around with it. Since the teeth of the gears 41 are enmeshed with those of the stationary sun gear 40, these gears rotate on their axes while revolving about the axis of the stud 39. This rotary motion of the gears 41 is transmitted through the planet shafts 42 to the output planet gears 44 which in turn transmit it to the output sun gear 46 causing this gear to rotate about the axis of the stud 39. The lug 51, integral with the gear 46 thereupon abuts an end of the slot 52 and induces rotation of the trowel carrier 54 and wings 56.

The trowel carrier 54 carries the ratchet wheel 64 with it, in a counterclockwise direction, as viewed in FIG. 4, the pawl riding over the surface of the ratchet teeth.

Referring to FIGS. 3 and 4, the wings 56 extending outwardly of the trowel carrier and constituting, in effect, a part thereof, are formed with a collar 69, each pivotally carrying a trowel shaft 70 to which is secured a spring arm 71 and a trowel swivel 72. As best shown in FIG. 4, each trowel swivel 72 is bored to receive a trowel arm 74 to one end of which is mounted a suitable counterweight 75. The opposite, or longer end of the trowel arm 74 carries a pair of shield mounting brackets 76 to which is secured a flat shield 77 which may be formed of spring steel, for example. The extreme end of each trowel arm is curved away from the direction of rotation of the trowel carrier and has a trowel mounting bracket 79 secured thereto, and a smoothing trowel 80 is carried by each such bracket for troweling movement in the direction indicated by the arrows in FIG. 4.

As shown in FIGS. 3, 4 and 5, a spring mounting ring 81 formed with fingers 82 is supported on the hub 57 on the trowel carrier 54, and a helical spring 84 extends between each of these fingers 82 and a portion of the spring arms 71 projecting away from the trowel shaft 70 so as to position the springs on the side of the pins adjacent the respective counterweights. Thus, it will be seen that the springs, acting through their respective spring arms 71 bias the trowel shafts 70 so as to rotate the trowel arms 74 counter-clockwise about the shafts 70, as viewed in FIG. 4, to urge the trowels 80 into troweling position.

Referring again to FIG. 3, there is shown a spool 84 mounted on the sleeve portion 49 of sun gear 46 for rotation therewith. The spool 84 has a pair of annular recesses to each of which is connected an end of flexible cable 85, the other end of which is connected to the outermost of the shield mounting brackets 76 on one of the trowel arms 74, for example, although this end of the cables may be connected to the arm at any point convenient to effect pivotal movement thereof about the axis of shaft 70 when the cable is placed under tension.

Normally the cables are maintained somewhat slack and have no effect on the trowel arms during the troweling operation, the springs 84 providing the proper troweling pressure. However, when it is desired to retract the trowels, as when a curve too sharp otherwise to negotiate is encountered, for example, the drive is momentarily reversed, whereupon the output sun gear will shift lug 51 from the end of the slot 52 which it normally abuts as shown in FIG. 5, to the opposite end thereof, the lug and slot providing a lost motion connection between the drive and the trowel carrier so that during this reverse movement of the lug the trowel carrier 54 is not driven but is stationary and the trowels 80 do not revolve about the axis of the stud 39. The spool 84 does rotate with the sun gear 46 and sleeve 49 however, and winds up the cables 85 thus pivoting the arms 74 about the trowel shafts 70 against the action of the springs 84 and into retracted position.

By the time the lug 51 traverses the entire annular length of the slot 52, the trowels will have been fully retracted and further reverse rotation naturally causes the trowel carrier to rotate in a direction opposite its normal direction of rotation, e.g., counterclockwise as viewed in FIG. 5 and clockwise as viewed in FIG. 4. The teeth of the ratchet wheel 64 thereupon grab the pawl 62 and the ratchet wheel is constrained to overcome the friction of the rubber friction ring 67 and ceases to rotate. Thus, in the event that the trowels are fully retracted and the reverse drive power remains on, the ratchet and friction ring act as a safety clutch to protect the cables 85 from being overloaded.

As shown in FIG. 7, the trowels 80 may be adjusted radially to serve pipes of various diameters by bolting extension pieces 86 to a trowel adapter 87 mounted on the trowel carrier 54 in place of the usual wings 56. At their outer ends, the extension pieces are bolted to carrier arms 89 which may support trowel shafts 70, spring arms 71 and trowel swivels 72 much as do wings 56. The trowels are carried on the arms 74 mounted in the swivels, as already described. By these means, it will be seen that the lining and troweling machine may be adapted to pipes having a wide range of diameters.

As has been mentioned, a difficulty frequently encountered in troweling the interior surface of pipe is the inability of the leading edges of the trowels to avoid contact with obstacles and projections on the inner pipe surface. Thus, the present concept includes provision for overcoming this problem.

In FIG. 6, one of the trowels 80 is shown as being curvilinear in sectional contour, although it may just as well be formed of flat sheet spring steel and creased as shown in phantom lines and in FIG. 4, for example. Assuming that the trowel is to advance axially of the pipe being lined in the direction of the arrow, then its leading edge is designated by the reference numeral 90. However, as stated, such an edge would be subject to contact with obstacles on the pipe wall, thus damaging the lining or the trowel or both. Accordingly, the leading edge is cut away along a curve tapering inwardly from the side edge 91 which may be considered as the forward rotating edge. Theoretically, the curved edge is parallel to a spiral projected radially from the pipe surface onto the trowel surface. For a given situation, the desired pitch of the leading edge is determined by dividing the trowel revolutions per second into the speed of linear advance of the trowel through the pipe in feet per second. Actually, of course, any curve of greater pitch will also clear the obstacles and, in fact, in practice it is convenient to use a flat curve of somewhat greater pitch than that computed. Thus, while the trowel advances linearly towards the obstacle 92, for example, the edge 90, being curved as stated clears the obstacle, and if the pitch of the leading edge is greater than the theoretical desired pitch, the leading edge actually recedes from the obstacle. Of course, if the side edge 91 of the trowel overrides the obstacle, no harm is done to it because this edge is actually spaced inwardly of the pipe wall, as clearly shown in FIG. 4, and the trowel arms 74 can yield against the resilient action of the springs 84. Even if the obstacle first overrides the end edge 91 and then leading edge 90, no problem is presented as the leading edge will not thereafter advance towards the obstacle.

As I have already indicated, machines of the class described have been subjected to some degree of vibration which adversely affects the deposition and troweling of the lining material and also shortens the life of various parts of the machine. I have found that much of this vibration is due to the fact that in a planetary drive of the type that has already been described herein, it is impossible to machine the output gears 44 so accurately that they will divide the driving torque equally between them at all times during a given cycle of rotation. Thus, at one point one of the gears 44 may be so positioned relatively to the output sun gear 49 that all of the driving torque is at that moment transmitted through it to the sun gear while the other planet gear, because of inherent and inescapable manufacturing tolerances, delivers no torque at all; and then in the next instant, when the next pairs of gears become enmeshed, the situation may have changed completely with the other of the planets now transmitting all of the driving torque. This constant shifting of torque transmission induces considerable stress instability and vibration in the machine.

To overcome these problems, I key the input planet gears 41 to their respective shafts 42 by means of four resilient keys spaced equidistantly about the circumference of each shaft 42. Thus, as shown in FIG. 8, the shaft 42 and planet gear 41 are formed with facing recesses 94 in which are seated resilient keys 95 of rubber or the like. It will be appreciated by those persons skilled in the art that, as a result of this construction, when one of the output planet gears 44 tends to bear the entire driving torque due to one of its driving teeth being slightly oversize relatively to its counterpart on the other output planet, the resilient keys 95 on the shaft 42 supporting the first output planet will yield somewhat to allow the other planet assembly to advance, as it were, relatively to the output sun gear and deliver its share of the driving torque. If, as the next planet teeth to enmesh with the output sun tend to cause the torque transmission to shift as described, then again the resilient keys on the second shaft 42 will come into play to allow an even torque distribution to be maintained.

I have also found that it is possible to reduce vibration in a planetary system of the type contemplated by forming the shafts 42 of a material or in a manner to lend a degree of resilience to them. Thus, I choose to form my shafts 42 of nylon, and to obtain precisely the desired amount of resilience I may bore these shafts longitudinally. In effect then, the shafts 42 are torque rods which may yield somewhat in a circumferential direction when the torque applied to them increases. This again enables the output planets carried by them to be slightly out of phase when necessary to maintain an even distribution of the torque load.

From the foregoing description it will be seen that I have contributed a self-cleaning, retractable troweling device in which vibration and the destructive effects thereof are materially reduced. The retracting action is responsive to a reversal of direction of the driving torque and the self-clearing feature is embodied in the design of the trowel itself. Additionally, the driving torque is transmitted through a planetary gear system wherein vibration is reduced by provision of resilient keys securing the input planets to the planet shafts and by constructing these shafts to be somewhat resilient in an annular direction much in the manner of a torsion bar.

I believe that the construction and operation of my novel self-cleaning, retractable troweling device will now be understood and that the advantages of my invention I now claim:

1. In apparatus of the class described, a trowel carrier, means mounting said trowel carrier for rotation, reversible drive means effecting rotation of said carrier in either annular direction, relative to the longitudinal axis of the carrier, a trowel pivotally mounted on said carrier in operative troweling position when said carrier is rotated in one annular direction, and retraction means operatively connected to said drive means pivoting said trowel from operative troweling position to retracted position upon reversal of the direction of rotation of said carrier by said drive means.

2. In apparatus of the class described, a trowel carrier, means mounting said trowel carrier for rotation, reversible drive means effecting rotation of said carrier in either annular direction, relative to the longitudinal axis of the carrier, a trowel pivotally mounted on said carrier in operative troweling position when said carrier is rotated in one annular direction, resilient means urging said trowel into operative troweling position, and retraction means operatively connected to said drive means pivoting said trowel from operative troweling position to retracted position upon reversal of the direction of rotation of said carrier by said drive means.

3. In apparatus of the class described, a shaft, a trowel carrier mounted for rotation on said shaft, drive means adapted to drive said carrier in either annular direction, trowel means carried in normal operative position on said carrier for rotation therewith and for pivotal movement relatively thereto, trowel retraction means disposed relatively to said drive means for driving rotation thereby in either annular direction, and a lost motion connection between said drive means and said trowel carrier, means connecting said retraction means and said trowel means whereby said retraction means effects pivotal movement of said trowel means relatively to said carrier and out of operative position upon rotation of said retraction means in one annular direction while said carrier is stationary due to said lost motion connection.

4. In apparatus of the class described, a shaft, a trowel carrier mounted for rotation on said shaft, drive means adapted to drive said carrier in either annular direction, trowel means carried in normal operative position on said carrier for rotation therewith and for pivotal movement relatively thereto, trowel retraction means disposed relatively to said drive means for driving rotation thereby in either annular direction, and a limited lost motion connection between said drive means and said trowel carrier, means connecting said retraction means and said trowel means whereby said retraction means effects pivotal movement of said trowel means relatively to said carrier and out of operative position upon rotation of said retraction means in one annular direction while said carrier is stationary due to said lost motion connection, and clutch means limiting the effect of said retraction means on said trowel means upon continued rotation of said retraction means in said one annular direction beyond the limit of said lost motion connection.

5. In apparatus of the class described, a shaft, a trowel carrier mounted for rotation on said shaft, trowel means carried in normal operative position on said carrier for rotation therewith and for pivotal movement relatively thereto, reversible drive means engaging said carrier for driven movement thereof in an annular direction to effect normal troweling movement of said trowel means, retraction means including spool means in driven connection with said drive means and a flexible cable connected between said spool means and said trowel means, said cable normally being slack during rotation of said carrier in said annular direction to effect normal troweling movement of said trowel means, and a lost motion connection between said drive means and trowel carrier whereby said spool means winds up said cable and pivots said trowel means relatively to said carrier and out of normal troweling position while said carrier is stationary upon rotation of said drive means in an annular direction opposite to said first mentioned annular direction.

6. In apparatus of the class described, a shaft, a trowel carrier mounted for rotation on said shaft, trowel means carried in normal operative position on said carrier for rotation therewith and for pivotal movement relatively thereto, reversible drive means engaging said carrier for driven movement thereof in an annular direction to effect normal troweling movement of said trowel means, retraction means including spool means in driven connection with said drive means and a flexible cable connected between said spool means and said trowel means, said cable normally being slack during rotation of said carrier in said annular direction to effect normal troweling movement of said trowel means, a lost motion connection between said drive means and trowel carrier whereby said spool means winds up said cable and pivots said trowel means relatively to said carrier and out of normal troweling position while said carrier is stationary upon rotation of said drive means in a direction opposite to said annular direction, and clutch means accepting the retracting force after said trowel means reaches retracted position.

7. In apparatus of the class described, a trowel for troweling a plastic lining on the interior surface of a pipe, means simultaneously rotating said trowel about an axis parallel to the longitudinal axis of the pipe and advancing said trowel axially within the pipe, said trowel comprising a leading edge and a forward rotating edge, said leading edge tapering rearwardly from the forward rotating edge at a pitch at least as great as the pitch of a spiral determined by dividing the trowel revolutions per unit of time into the linear travel of the trowel per unit of time through the pipe.

8. In apparatus of the class described, a trowel for troweling a plastic lining on the interior surface of a pipe, said trowel being rotatable about an axis parallel to the axis of the pipe and being movable axially within the pipe, said trowel comprising a leading edge following the path of a spiral projected radially from the pipe surface on to the trowel surface, the pitch of said spiral being determined by dividing the trowel revolutions per unit of time into the linear travel of the trowel per unit of time through the pipe.

9. In apparatus of the class described, a trowel for troweling a plastic lining on the interior surface of a pipe, said trowel being rotatable about an axis parallel to the axis of the pipe and being movable axially within the pipe, said trowel comprising a leading edge having a spiral pitch at least as great as the pitch of a spiral determined by dividing the trowel revolutions per unit of time into the linear travel of the trowel per unit of time through the pipe.

10. In apparatus of the class described for troweling a lining on the interior surface of a pipe and including a trowel carrier, trowel means mounted on said trowel carrier, and a planetary drive connected to said trowel carrier; the improvement that comprises, a stationary sun gear, input planet gears enmeshed with said sun gear for orbital movement therearound, a rotatable output sun gear, output planet gears enmeshed with said output sun gear for orbital movement about the axis thereof and for driving same about its own axis, a planet shaft connecting corresponding planet input and output gears, and resilient means mounting said input planets on their respective shafts to allow a limited degree of annular movement therebetween.

11. In apparatus of the class described for troweling a lining on the interior surface of a pipe and including a trowel carrier, trowel means mounted on said trowel carrier, and a planetary drive connected to said trowel carrier; the improvement that comprises, a stationary sun gear, input planet gears enmeshed with said sun gear for orbital movement therearound, a rotatable output sun gear, output planet gears enmeshed with said output sun gear for orbital movement about the axis thereof and for driving same about its own axis, a planet shaft connecting corresponding planet input and output gears, and a plurality of resilient keys circumferentially spaced about the axis of each planet shaft and mounting said input planets on their respective shafts to allow a limited degree of annular movement therebetween.

12. In apparatus of the class described for troweling a lining on the interior surface of a pipe and including a trowel carrier, trowel means mounted on said trowel carrier, and a planetary drive connected to said trowel carrier; the improvement that comprises, a stationary sun gear, input planet gears enmeshed with said sun gear for orbital movement therearound, a rotatable output sun gear, output planet gears enmeshed with said output sun gear for orbital movement about the axis thereof and for driving same about its own axis, a planet shaft connecting corresponding planet output and input gears, said shaft having a plurality of spaced keyways, resilient keys mounted in said keyways and connected to said input planet gears to mount same on their respective shafts allowing a limited degree of annular movement therebetween, said shaft being bored longitudinally and formed of a somewhat resilient material to permit a limited degree of torsional movement of one end thereof relatively to the other end thereof.

References Cited in the file of this patent

UNITED STATES PATENTS

| | | |
|---|---|---|
| 1,988,329 | Perkins | Jan. 15, 1935 |
| 2,157,421 | McFarland | May 9, 1939 |
| 2,399,321 | Butler | Apr. 30, 1946 |
| 2,575,353 | MacEvoy | Nov. 20, 1951 |
| 2,931,060 | Kelly | Apr. 5, 1960 |

FOREIGN PATENTS

| | | |
|---|---|---|
| 858,745 | Great Britain | Jan. 11, 1961 |